May 15, 1962     T. P. HIGNETT ET AL     3,034,883
PRODUCTION OF GRANULAR SUPERPHOSPHATE FERTILIZER
Filed Sept. 30, 1957
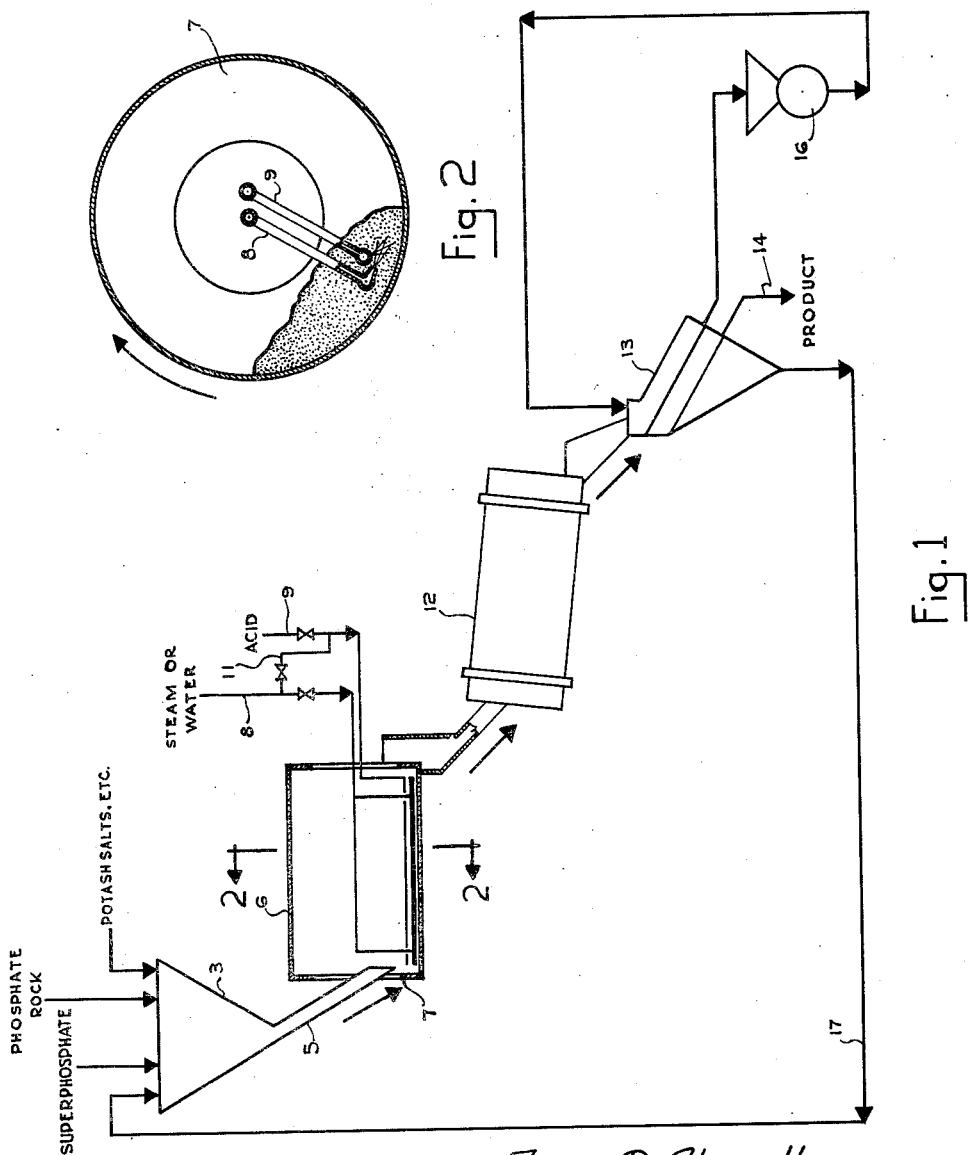
Travis P. Hignett
Alvin B. Phillips
Ronald D. Young. INVENTORS.
BY Bentley C. Morrow
Attorney

United States Patent Office 3,034,883
Patented May 15, 1962

3,034,883
PRODUCTION OF GRANULAR SUPER-
PHOSPHATE FERTILIZER
Travis P. Hignett, Sheffield, and Alvin B. Phillips and
Ronald D. Young, Florence, Ala., assignors to Tennessee Valley Authority, a corporation of the United States
Filed Sept. 30, 1957, Ser. No. 687,311
1 Claim. (Cl. 71—37)
(Granted under Title 35, U.S. Code (1952), sec. 266)

The invention herein described may be manufactured and used by or for the Government for governmental purposes without the payment to us of any royalty therefor.

This invention is an improved process for the granulation of superphosphate fertilizer.

Superphosphate fertilizers are widely produced by reacting phosphate rock with sulfuric or phosphoric acid. The fresh product of this reaction is a friable mass, which usually is broken up by a disintegrator and the resulting broken product is stored in piles or dens for 2 to 6 weeks for completion of the reaction, or curing. During this curing period, the superphosphate again sets up into a solid mass that has to be crushed before it can be used.

There is strong demand for superphosphate in granular form. In the past, granulation of superphosphate has been carried out by crushing cured superphosphate to a powder, wetting the superphosphate with sufficient water to cause plasticity, and rolling the moistened material in a drum until granules are formed. This process has the double disadvantage of resulting in very weak and friable granules which disintegrate easily, and producing a wet product that requires excessive drying before storage. It is known that the strength of the granules can be improved by including certain salts in the superphosphate being granulated. Ammonium phosphate is known to be particularly effective in increasing strength of such granules.

Although the strength of superphosphate granules can be increased in this manner, thus eliminating one of the disadvantages mentioned above, it is still necessary to dry the product by evaporating a large quantity of water from it. This adds considerably to the expense of producing fertilizer. Also, this method for strengthening granules cannot be used unless it is desired to include nitrogen in the finished product.

Another known method for making granular concentrated superphosphate comprises treating phosphate rock with dilute phosphoric acid to form a slurry. The slurry is granulated by addition of recycled fines, dried, and screened; and much of the product is recycled to the granulation step. The disadvantages of this method are (1) very large recycle ratio is required, which makes both the equipment and operating costs high, and (2) the granules are dense and therefore ill-suited for use in ammoniation processes.

It is an object of this invention to provide a one-step process for producing strong, porous granules of superphosphate fertilizer which requires very little drying or no drying at all.

Another object is to provide a process for preparing granular superphosphate fertilizer in which the long curing time formerly necessary is substantially shortened.

Another object is to provide a process for producing superphosphate fertilizers that are suitable either for use as such or for use in ammoniation processes to produce nitrogen-containing fertilizers.

Still another object is to provide such process which is applicable to superphosphate alone or to mixtures of superphosphate, potash salts, and/or trace elements.

Another object is to provide such process which is characterized by inherent low production costs and which may be carried out in simple and inexpensive equipment.

Other objects and advantages will be apparent from the following description.

We have found that these objects are attained in a process which comprises introducing a material comprising phosphate rock, either alone or in admixture with concentrated superphosphate, potash salts, and/or trace elements, into a revolving drum; therein maintaining a bed of rolling particles of such introduced material; injecting a material selected from the group consisting of sulfuric acid and phosphoric acid, and mixtures thereof, beneath the surface of the bed of rolling particles at a plurality of points spaced from each other lengthwise of the drum and in quantity sufficient to react with the phosphate rock to form superphosphate; introducing a controlled quantity of water, either as liquid or as steam, insufficient to form a slurry in a manner which avoids loss of heat of dilution; raising the temperature of the materials in the drum to a point where good granulation is obtained at low moisture content; and withdrawing a granular product from the drum.

When sulfuric acid is used, the heats of dilution and reaction are usually sufficient to heat the materials enough for good granulation, but when phosphoric acid alone is used it is often necessary to supply additional heat. When this is done, it is preferably is accomplished by injecting steam into the bed of rolling particles. The steam introduced not only heats the material but also supplies all or part of the water required. The plasticity of the superphosphate during the first few minutes immediately after it is formed by reaction between phosphate rock and acid is sufficient to cause granulation of the mixture at reasonably low temperatures—usually about 160° to 220° F. The granules formed are strong, porous, and substantially dustless, whether the solid material fed be phosphate rock only or phosphate rock in admixture with superphosphate, potash salts, trace elements, etc.

These porous granules of superphosphate cure much more rapidly than nongranular material or dense granules of superphosphate. The porous nature of the granules gives a distinct advantage also when it is desired to ammoniate the product after curing, since these porous granules take up ammonia at a more rapid rate and in greater total quantity than granules formed by granulating crushed, cured superphosphate with water. With most formulations our products require no drying at all, other than the evaporation of water which occurs spontaneously at granulation temperatures and during cooling.

The attached drawing illustrates an application of the principles of our invention. FIGURE 1 is a schematic diagram of an overall process; FIGURE 2 is an enlarged cross section on the line 2—2 of FIGURE 1, illustrating a preferred type of granulating drum equipped with suitable means for introducing fluid materials.

Therein the reference numeral 3 designates a hopper arranged to feed fine phosphate rock, recycled fines, superphosphate, potash salts, and trace elements at controlled rate into any suitable means for conveyance, illustrated as chute 5. The solid material fed must contain phosphate rock and may also contain any or all the other materials mentioned above, as may be required for the particular formulation desired. Drum 6 is maintained in continuous rotation.

The ends of drum 6 are equipped with annular members 7, so that a bed of rolling particles of the solid feed is maintained in drum 6. A material selected from the group consisting of sulfuric acid, phosphoric acid, and mixtures thereof in quantity sufficient to react with the phosphate rock contained in the feed to form superphosphate is introduced beneath the bed of rolling particles in drum 6 at a plurality of points spaced from each other lengthwise of the drum via line 9 having perforations beneath the bed of particles.

A controlled quantity of water, which may be either liquid, steam, or both, is introduced into the incoming acid in a manner that results in diluting the acid without loss of heat of dilution. The manner of introducing water into the acid may be, and preferably is, varied according to the particular granular fertilizer produced. Thus when granular ordinary superphosphate is the product sulfuric acid will be the acid used, and we have found it preferable to introduce the water required as liquid injected into the acid in line 9 via line 11. Flow of the acid-water mixture through line 9 and the perforations in the line below the surface of the bed of rolling particles in drum 6 results in uniform dilution of the acid. We have found uniformity of dilution to be a factor of some importance in obtaining proper granulation of ordinary superphosphate.

When granular fertilizers of higher grades are the product, the water required may be introduced via line 8 having a perforation adjacent to each of the perforations in acid line 9 beneath the bed and disposed so that incoming water impinges upon and immediately mixes with incoming acid. Both steam and liquid water may be introduced in this manner, if both are required. We have found it preferable to introduce steam, in all cases where steam is necessary, in this manner because incoming jets of steam impinging upon incoming acid have a tendency to convert the acid to a spray or mist which improves mixing with the solid materials.

We have found that the quantity of water required is quite low when introduced as described above and is not great enough to result in the formation of a fluid slurry. The resulting mixture of freshly formed superphosphate and other materials is sufficiently plastic at temperatures in the range from about 160° F. to 220° F. that good granulation results without going through a slurry stage. We prefer to use temperatures in the lower part of this range for formulations containing large proportions of potash salts, such as 0–20–20, and in the upper part of the range when phosphate rock alone is used with sulfuric acid. With some formulations it is desirable to introduce all the water required in the form of steam.

The combined effect of heats of dilution and reaction of the resulting diluted acid with phosphate rock frequently is sufficient to raise the bed of rolling particles to granulation temperatures. When phosphoric acid alone is used, as may be the case when formulations containing up to 55 percent available $P_2O_5$ are desired, it is often necessary to add heat. We prefer to add this heat by injecting steam via line 8 beneath the bed of rolling particles. Steam introduced in this manner also supplies all or part of the moisture required. In any case, heat is supplied in quantity sufficient to maintain temperatures in the range from 160° F. to 220° F., and the rate of feeding solid materials is adjusted so that good granulation is obtained during the passage of the material through drum 6.

The resulting granulated superphosphate fertilizer is withdrawn from drum 6 and is introduced into a second rotary drum 12. Drum 12 ordinarily functions principally as a cooling device, although ssome additional granulation also occurs during the passage of the material through it. Granulated material emerging from drum 12 is conducted to a sizing device, illustrated as a double screen 13. Granules of the size desired are withdrawn at 14 to storage for curing. Oversize material is conducted from screen 13 to crusher 16, is crushed and recycled to screen 13. Recycle from the screen is returned to feed hopper 3 via line 17.

The principal advantages obtained by proceeding as described above are that usually all or a large part of the heat required for granulation is furnished by heats of dilution and reaction; in those formulations that require additional heat the heat requirement is greatly reduced; the amount of water added is so small that a slurry is not produced; it is usually not necessary to dry the product and, with such formulations as require some drying, it is easy and cheap to supply the additional heat in drum 12 since the material is almost dry when it enters this drum; and in the mechanical strength combined with porosity in the granular product. We have found that this porous, granular product cures more rapidly than dense granules produced by conventional processes, the usual curing time being about 1 week for our product as contrasted with a period of from 2 to 6 weeks for other products having the same formulation. This reduction in curing time also reduces inventory costs and storage-space requirements. After curing, our porous granuless also have the property of taking up ammonia very rapidly in higher proportion without undue ammonia loss, as contrasted with dense granules when ammoniation of the product is desired. Also, we may prepare porous granules of superphosphate fertilizers by our process which contain up to 55 percent available $P_2O_5$, whereas about 46 percent available $P_2O_5$ is the usual maximum for fertilizers made by processes which involve passing through a slurry stage before granulation.

*Example I*

We have produced several grades of granular two-component fertilizers ranging in analysis from 0–14–14 to 0–26–26 in a pilot plant constructed as shown in the attached drawing and using the method described above. Phosphate rock was used to supply all or part of the $P_2O_5$ required and to promote granulation by the plasticity of freshly formed superphosphate. The rock and other dry ingredients used were acidulated with sulfuric or phosphoric acid in quantity sufficient to react with the phosphate rock in the feed to form superphosphate. This acid was introduced beneath a bed of rolling particles in a rotary drum corresponding to drum 6 in the drawing. The acid was introduced through a line perforated at a number of points spaced from each other lengthwise of the axis of rotation of the drum. Water or steam was introduced at points adjacent to the points where acid was introduced to provide moisture for granulation and conversion of $P_2O_5$ to available form.

The granular product emerging from the drum was cooled but not dried. Oversize fractions were crushed and returned to the screen, since large quantities of recycle are not required to control granulation in this process. Granulation was excellent. The granules obtained were porous, but had much better mechanical strength than is obtained by the usual method of granulating superphosphate and potassium chloride with water. The need for drying the product was eliminated; and the resulting granules were found to be quick-curing, requiring not more than a week or so. The off-gas was found to be quite corrosive to mild steel, since it apparently contains small quantities of hydrochloric acid. Thus, protective coatings are indicated for mild steel offgas systems in plants using this process.

Typical formulations and operation data are shown in the following table.

| Grade | 0-14-14 | 0-20-20 | 0-26-26 |
|---|---|---|---|
| Formulation, pound/ton product: | | | |
| Phosphate rock | 888 | 420 | 163 |
| Concentrated superphosphate | | 574 | 771 |
| Sulfuric acid (94 percent $H_2SO_4$) | 613 | 281 | |
| Phosphoric acid (78 percent $H_3PO_4$) | | | 148 |
| Muriate of potash | 452 | 657 | 888 |
| Water | 140 | 100 | |
| Steam | | 50 | 125 |
| Recycle, percent of total feed | 48 | | 8 |
| Drum temperature, ° F | 162 | 162 | 157 |
| Percent of +6 −28 mesh material: | | | |
| As granulated | 63 | 61 | 49 |
| After crushing oversize | 72 | 87 | 84 |
| Moisture content of product, percent | 4.1 | 3.7 | 4.3 |
| Net conversion of $P_2O_5$ in rock, percent [1] | 94 | 98 | 92 |

[1] After 1 to 7 days of curing.

Example II

Concentrated granular superphosphate has been prepared in the pilot plant described in Example I. Phosphate rock, ground to such fineness that about 75 percent passed a 200-mesh screen and recycled fines were fed to drum 6. Phosphoric acid and steam were introduced beneath the resulting bed of rolling particles to maintain the temperature and moisture level required for granulation. Both wet-process and electric-furnace phosphoric acid have been used in various runs. The wet-process acid usually was preheated to about 250° F. Production rate in many runs was about 1 ton per hour.

When wet-process acid was used, we found that the product had a tendency to cake on the equipment used to pulverize the oversize material. A hammer mill was not satisfactory for this purpose, because of caking; but a roll mill followed by a cage mill gave satisfactory crushing. The crushed product also had some tendency to blind the screens, making it necessary to clean them occasionally.

When electric-furnace acid was used, it was found to be unnecessary to preheat the acid, caking on crushing equipment was avoided, and smaller recycle rates were obtained.

The products obtained with either acid had a porous structure, could be stored in piles without caking, and had high mechanical strength after curing. After curing, these granules could be ammoniated with about the same ease as nongranulated superphosphate.

The following data are typical of those obtained in many runs using wet-process acid.

| | |
|---|---|
| Production rate, ton/hour | 0.75 |
| Feed rate, pound/ton product: | |
| Phosphate rock (32 percent $P_2O_5$) | 820 |
| Phosphoric acid (53 percent $P_2O_5$) | 1280 |
| Steam | 185 |
| Recycled fines | 2350 |
| Temperature, ° F.: | |
| Input acid | 250 |
| Drum product | 212 |
| Screen analysis of cooler product, percent: | |
| +6 mesh | 38 |
| −6 +20 mesh | 45 |
| −20 mesh | 17 |
| Chemical analysis of product after 2 weeks of curing, percent: | |
| $P_2O_5$: | |
| Total | 47.9 |
| Available | 46.9 |
| Water soluble | 44.4 |
| Free acid | 2.1 |
| CaO | 20.3 |
| $H_2O$ | 4.1 |
| F | 1.6 |
| Conversion of $P_2O_5$ from rock, percent | 93 |

Example III

Ordinary superphosphate (about 20 percent $P_2O_5$) and enriched superphosphate (about 34 percent $P_2O_5$) also have been produced in the same pilot plant under substantially the same operating conditions as described in Example II, except that recycled fines were dried to a moisture content of 1 to 3 percent and the water required was introduced into the sulfuric acid in a line corresponding to line 8 in the drawing. This water was sufficient to give an $H_2SO_4$ concentration of 65 to 70 percent in the line.

Data from one typical run producing granular ordinary superphosphate are given in the following table.

| | |
|---|---|
| Production rate, ton/hour | 0.5 |
| Feed rate, pound/ton product: | |
| Phosphate rock (33 percent $P_2O_5$) | 1151 |
| Sulfuric acid (93 percent $H_2SO_4$) | 738 |
| Water | 213 |
| Steam | 426 |
| Recycle | 4784 |
| Moisture content, percent: | |
| Drum product | 5.0 |
| Cooler product | 2.6 |
| Product analysis after 2 weeks of curing, percent: | |
| $P_2O_5$: | |
| Total | 21.7 |
| Available | 21.0 |
| Free acid | 0.8 |
| CaO | 29.7 |
| $SO_3$ | 29.8 |
| $H_2O$ | 3.3 |
| Conversion of rock $P_2O_5$, percent | 97 |

Enriched superphosphate was made in the same way with suitable variations in the proportions of materials fed. Moisture content of the resulting product was about 4.5 percent.

The product granules in each case were noncaking, porous, of good mechanical strength, and easily ammoniated.

We claim as our invention:

In the continuous process of preparing granular superphosphate fertilizer by reacting in an inclined rotating drum phosphate rock and an acidulating material selected from the group consisting of sulfuric acid, phosphoric acid, and mixtures thereof: in which the phosphate rock is continuously introduced into an upper end of said drum; in which a bed of rolling solid discrete particles comprising material introduced into said drum is maintained therein; in which the acidulating material is continuously introduced beneath said bed of particles at a plurality of locations within said drum and in quantity sufficient to react with said phosphate rock to form superphosphate, said locations spaced from one another lengthwise of said drum; in which a temperature of about 160° F. to about 220° F. is maintained within said drum; and in which the granular superphosphate product is withdrawn from the lower end of said drum and a portion of said withdrawn material is separated therefrom for recycle to said drum; the improvement in combination therewith which comprises controlling the total addition of moisture introduced into such drum by both (1) the direct addition of moisture to the stream of acidulating material prior to introducing said acidulating material beneath said bed of particles and (2) the indirect addition of the moisture originally associated with the acidulating material and the phosphate rock, in quantity substantially sufficient to maintain in said bed a tendency to coalescence of said particles; which said particles are subsequently withdrawn from the lower end of said drum as a strong, porous, and dry granular superphosphate product containing less than about 4.5 weight percent moisture.

References Cited in the file of this patent
UNITED STATES PATENTS

| | | |
|---|---|---|
| 1,880,544 | Waggaman | Oct. 4, 1932 |
| 2,136,793 | Gabeler et al. | Nov. 15, 1938 |
| 2,598,658 | Procter et al. | May 27, 1952 |
| 2,618,546 | Davenport | Nov. 18, 1952 |
| 2,710,795 | Douglass | June 14, 1955 |
| 2,729,554 | Nielsson | Jan. 3, 1956 |
| 2,837,418 | Seymour | June 3, 1958 |
| 2,858,203 | Bellinzoni | Oct. 28, 1958 |
| 2,886,426 | Gera | May 12, 1959 |